United States Patent [19]

Baes et al.

[11] 4,249,991

[45] Feb. 10, 1981

[54] COMPOSITION OF A MATERIAL BASED ON MINERAL FIBERS

[75] Inventors: Emile Baes, Kapelle op den Bos; Jean-Pierre Navez, Gent; Marc Della Faille de Leverghem, Florree, all of Belgium

[73] Assignee: S.A. Redco, Brussels, Belgium

[21] Appl. No.: 921,196

[22] Filed: Jul. 3, 1978

[30] Foreign Application Priority Data

Jul. 8, 1977 [FR] France .................. 77 21059

[51] Int. Cl.$^3$ .................. C08L 3/01; C04B 43/02; D21H 5/18

[52] U.S. Cl. .................. 162/152; 106/214; 162/145; 162/181 D

[58] Field of Search .................. 162/32, 23, 152, 181 C, 162/181 D; 106/214; 264/58

[56] References Cited

U.S. PATENT DOCUMENTS

| | | | |
|---|---|---|---|
| 1,498,401 | 6/1924 | Perry | 162/121 |
| 1,672,249 | 6/1928 | Ellis | 162/132 |
| 3,001,882 | 9/1961 | Taylor | 106/120 |
| 3,470,062 | 9/1969 | Ollinger | 162/152 |
| 3,510,394 | 5/1970 | Cadotte | 162/152 |
| 3,899,555 | 8/1975 | Takao et al. | 162/152 |
| 3,922,241 | 11/1975 | Barker et al. | 260/38 |
| 3,968,004 | 7/1976 | Coffey et al. | 162/152 |
| 4,137,214 | 1/1979 | Sochalski | 106/36 |

*Primary Examiner*—Theodore Morris
*Attorney, Agent, or Firm*—Bucknam and Archer

[57] ABSTRACT

A material of the board type for various thermal shielding applications preferably contains 10 to 50% by weight of a mineral substance based on silica or silicates in fibrous form prepared from the fused substance, 10 to 70% by weight of clay, if necessary 10 to 60% by weight of a mineral having a needle-like crystal structure, and a small proportion of an organic binder for maintaining the mineral constituents in a coherent structure at least during fabrication, conversion and utilization of the end product. The total quantity of organic substances does not exceed 8% by weight of dry substances. The material has high temperature strength by virtue of the combination of an organic binder with a mineral binder and also has good dimensional stability.

14 Claims, No Drawings

COMPOSITION OF A MATERIAL BASED ON MINERAL FIBERS

This invention relates to the fabrication of materials based on mineral fibers and more especially the fabrication of materials in which these fibers are maintained in a coherent structure by a small proportion of organic binder and of baked products derived therefrom. The invention is concerned in particular with the composition of these materials as well as the method adopted for their manufacture and further extends to the materials themselves as well as to all their applications.

The compositions in accordance with the invention can readily be prepared by means of techniques which are well known to asbestos board manufacturers. These techniques essentially consist in preparing a suspension of solid constituents from which the suspension medium is removed after having been deposited on a filtering support, especially in a number of superposed layers deposited in succession.

As a rule, the procedure adopted in practice is as follows: the fibers, the other mineral constituents of the composition and the organic binder are mixed with a high proportion of water so as to form a fluid suspension which is diluted with water if necessary and then fed to one or a number of vessels. A cylindrical screen which is rotatably mounted and partially immersed within each vessel serves to collect the suspension which is thus rotated whilst the excess quantity of water drips through the holes of the screen which applies the suspension in the form of a thin moist layer on an endless belt or band conveyor through which the entrained water is also permitted to pass. At each revolution of the endless band, the layer thus formed is transferred onto a so-called format cylinder on which the successive layers are wound and stacked one on top of the other. When the desired thickness is attained on this cylinder, the complete assembly is cut along a generator-line in order to remove it from the cylinder. After complementary drying and hardening of the binder, the plate thus collected is essentially constituted by the fibers and the other constituents which are maintained in a coherent structure designated as board or felt. A very small proportion of organic binder can prove sufficient to ensure cohesion, thus making it possible to comply with strict standards while limiting this proportion to values of the order of 3% by weight in the case of thermal screens. The products obtained have the further advantage of high tensile strength and can thus be given various shapes by die-stamping the plates.

In the composition in accordance with the invention, the fibrous material is an artificial mineral-fiber material. This designation includes all fibrous materials which are manufactured on an industrial scale by means of techniques involving fusion of a mineral substance which usually has a base of silica or silicates and which can in turn be of either artificial or natural origin. When employing the fused substance as starting material, the usual method consists either in drawing, in which case fibers having predetermined and uniform lengths can be cut-out, or by centrifugation or blowing, in which case wool fibers having very variable dimensions are obtained.

One composition in accordance with the invention advantageously contains, with respect to the total content of dry constituents, 5 to 95% by weight of an artificial mineral-fiber material of this type which preferably has a base of silicates, at least 4% by weight of clay and at least 0.5% by weight of organic binder. The composition can further contain fillers constituted by mineral substances other than clay as well as a small proportion of organic fibers and especially cellulose fibers, with the result that the total proportion of organic substance (including binder) does not exceed 8% by weight of the total weight of dry substances of the composition.

In the composition according to the invention, the mineral-fiber material is preferably present in a proportion within the range of 10 to 50% by weight. The fibers usually have a ratio of length to diameter which is at least equal to 10 or higher than 10 with lengths which preferably vary between 0.1 and 100 mm and diameters within the range of 0.1 to 40 microns. It is possible in particular to utilize glass or glass wool fibers and these latter are advantageously selected from the technical grades which are sold in order to permit of dispersion in an aqueous medium. Preference is nevertheless given to fibrous materials having a base of silicates of the fiber or wool type, especially the ceramic or ceramic wool fibers essentially constituted by aluminum silicate, rock wool which further contains appreciable proportions of alkaline-earth silicates, slag wool, scoria wool, or any mixture of these materials. The preferred materials have lengths of fiber within the range of 0.1 to 50 mm and more especially, depending on commercial availabilities, mean lengths within the range of 0.1 to 15 mm in the case of the fibers of such mineral wools as glass wool, rock wool, slag or scoria wool in particular, and the ceramic fibers, or lengths within the range of 3 to 25 mm in the case of glass fibers, with diameters of the order of 10 to 20 microns in the case of glass fibers and of the order of 1 to 10 microns on an average in the case of the mineral wools.

Moreover, it has appeared particularly advantageous to employ an artificial fibrous material containing in combination fibers or mineral wools based on silicates of the type consisting of ceramic fibers or wools, rock wools, slag wools, scoria wools, and glass fibers, the proportion of glass fibers being preferably of the order of 0.5 to 10% of the total weight of dry substances of the composition. The presence of these glass fibers increases the tensile strength of the finished plates and, during fabrication of these latter, endows the product with higher resistance in the fresh state prior to hardening of the binder.

In another embodiment of the invention, the composition contains a mineral based on silicates having a needle-like crystal structure in a proportion which is advantageously within the range of 10 to 60% by weight. A mineral of this type can consist in particular of wollastonite. It is an advantage to choose grades in which the needles have a ratio of length to diameter within the range of 5 to 40 and preferably a mean particle diameter within the range of 5 to 10 microns. This mineral results in material having very good dimensional stability in which the absence of shrinkage at high temperature permits of baking without deformation.

The proportion of clay in the composition according to the invention is advantageously within the range of 5 to 90% by weight and preferably 10 to 70% by weight. As in the case of the other constituents, the proportions in this instance are expressed with respect to the total weight of dry substances. It is possible to employ any type of clay although preference is nevertheless given to kaolin and the kaolinite group of clay minerals which contain 20 to 90% by weight of kaolin. It can also be considered sufficient to employ a proportion of the order of 10 to 50% by weight of clay and to include in the composition 5 to 45% by weight of mineral fillers such as in particular ground quartz which has the advantage of reducing the cost price and facilitating the fabrication of plates. Other suitable fillers are kieselguhr, perlite, fly ash, diatomaceous earth, mica and other finely divided natural minerals.

The organic binder can be incorporated in the composition in any proportion within the range of 0.5 to 8% by weight. This proportion is preferably limited, however, to values within the range of 1 to 5% and in particular to the order of 3% by weight in the case of end products which satisfy the same requirements of flammability and thermal protection efficiency as asbestos boards.

In applications which permit a higher proportion of organic substances, it nevertheless proves advantageous to limit the proportion of binder to values of the order of 1 to 3% by weight and in this case to incorporate organic fibers and especially cellulose fibers with the composition in proportions within the range of 0.5 to 7% by weight and preferably 1 to 5% by weight of the total quantity of dry substances of the composition.

All the conventional organic binders can be employed either alone or in mixtures, especially the starches, the dextrins, and polyvinyl acetates and more generally all the natural or synthetic gums which are employed in solution or in emulsion in water. The best results appear to be obtained when the binder consists at least partly of starch. It is in any case an advantage in this case to employ starch of the soluble type in the cold state as well as starch which has been treated so as to exhibit at the surface ionic properties which produce a flocculating effect. By way of alternative, flocculating agents such as the polyacrylamides and the other known polyelectrolytes can be incorporated in the composition in proportions of the order of 0.005 to 0.05% by weight with respect to the total weight of constituents of the composition in the dry state.

It will readily be apparent that the scope of this patent extends to the materials obtained from the above composition irrespective of the method of production adopted. As a general rule, this composition is particularly well suited to any method of production involving preparation of a suspension and removal of excess liquid through filtering walls which support or contain the suspension; preference is nevertheless given to the board production technique mentioned earlier in which the binder is hardened by drying in air or preferably by oven-drying. The finished product has a dry-substance composition which is similar to the one mentioned for the starting composition with a moisture content below 5% and preferably below 1% by weight. Said product can be formed and cutout prior to hardening of the binder if necessary but can also be marketed in the form of flat plates or plates having any other suitable configuration which are subsequently shaped and machined.

The material of the board type in accordance with the invention has high tensile strength and excellent high-temperature strength. In general, the tensile strength of the material is usually higher than 20 kg/cm$^2$ and especially of the order of 25 to 70 kg/cm$^2$ and its density is of the order of 0.5 to 1.3 and preferably 0.9 to 1.2. In this preferred embodiment, the material has outstanding dimensional stability since it is shown by the bar-linear shrinkage test that the expansion of the material is less than 2% after 24 hours at 1000° C.

One essential advantage of the material in accordance with the invention lies in the fact that the clay contained therein constitutes a mineral binder which combines its effects with those of the organic binder in order to ensure constant mechanical resistance from room temperature to temperatures of the order of 1100° C. The organic binder performs an essential function in the cohesion of the product during fabrication, during conversion and utilization of the product as well as throughout the time of use at a relatively low temperature, for example when it constitutes a thermal screen exposed to temperatures which do not exceed 500° C. The function of the organic binder is maintained up to temperatures corresponding at least to incipient sintering of the clay contained in the composition. In consequence, when the product is exposed to high temperatures in the event, for example, of substantial heat generation resulting in combustion of the organic binder, the clay takes over from said organic binder in order to ensure mechanical resistance of the material which also retains both its shape and its thermal shield properties.

As a consequence of the foregoing, the invention further extends to the baked products which can be obtained from materials of the board type in accordance with the invention, the baking operation being usually carried out at a temperature within the range of 1050° C. to 1200° C. during a period of the order of two hours to three days. In particular, it is thus possible to obtain porous ceramic plates having a laminar structure and endowed with excellent resistance to chemical agents and especially to acids. By way of example, the plates can be employed in the construction of internal furnace shields. Furthermore, these baked products can be produced in a wide range of different shapes, the shaping operation being carried out when the material is still in the state of sufficiently moist board. The compositions containing a mineral having a needle-like structure such as wollastonite are particularly suitable for this application.

An explanatory illustration of the invention will now be provided by particular examples of execution, these examples being given without any limitation being implied. Unless it is stated to the contrary, the figured indications of proportions will be expressed as percentages by weight as calculated with respect to the total weight of dry substances employed in the preparation of the products. However, the figures concerning the emulsions of polyvinyl acetate (abbreviated to PVA) contain the water of the emulsion.

EXAMPLE I

Plates of material based on mineral fibers maintained in a coherent structure are prepared by making use of fibrous material consisting of rock wool which is available under the commercial designation of "Rockwoll" to which are added glass fibers.

The following composition is employed:

|  | % by weight |
| --- | --- |
| Rock wool, mean length 1.2 mm | 38.62 |
| Rock wool, mean length 0.4 mm | 6.43 |
| Glass fibers, type E (6 mm) | 1.29 |
| Cellulose fibers : raw Kraft paste | 2.06 |
| Kaolinite clay containing 63% kaolin | 28.96 |
| Mica | 6.43 |
| Ground sand | 11.58 |

-continued

|  | % by weight |
|---|---|
| PVA emulsion containing 50% polyvinyl acetate in water | 2.06 |
| Soluble starch | 2.56 |
| Flocculant : amphoteric polyelectrolyte | 0.01 |

The fibers are dispersed in water for a period of 10 minutes, in a vessel fitted with a stirrer which produces high turbulence. The clay, the fillers and the organic binders (PVA emulsion and starch) are added. The mixture is stirred for a further period of 10 minutes before being pumped into a buffer tank fitted with a low-speed propeller-type stirrer. This mixture is prepared with a content of 100 g of dry substances per liter.

The suspension thus obtained is fed by means of a pump or under gravity into a chamber fitted with a rotary screen. A layer of material is formed on the surface of the rotary screen. The screen deposits said layer on a band conveyor which in turn deposits the layer on a rotating cylinder. When the desired thickness is attained on the cylinder as a result of stacking of successive layers, the compacted and stratified product is removed from said cylinder and transferred into a drier.

At the outlet of the drier, there is obtained a plate of material having a moisture content of less than 5%. The drying operation may be continued if necessary until a moisture content of less than 1% is attained. The dried product can be subjected to any suitable finishing operation, depending on the applications for which it is intended.

The material obtained with the composition given above has the following characteristics:
Density—0.9
Tensile strength—22 kg/cm$^2$ $\perp$ fibers 28 kg/cm$^2$ $\parallel$ fibers
Thermal conductivity $\lambda = 0.112$ kcal/hm° C.

The tensile tests are carried out by applying either a tractive force at right angles to the direction of preferential orientation of the fibers in the material ($\perp$ fibers) or a tractive force in a direction parallel to said preferential orientation ($\parallel$ fibers). This preferential orientation arises from the mode of operation applied to the fabrication of the material and involving deposition of fibers in suspension on a moving filter support.

EXAMPLE II

The operation is performed as in Example I by employing the following composition:

|  | % by weight |
|---|---|
| Rock wool, mean length 1.2 mm | 61.88 |
| Kaolinite clay | 31 |
| Cellulose fibers : raw Kraft paste | 3.6 |
| 50% PVA emulsion | 1.7 |
| Soluble starch | 1.7 |
| Flocculant : amphoteric polyelectrolyte | 0.012 |

The material obtained has the following characteristics:
Density—0.9
Tensile strength—32 kg/cm$^2$ $\equiv$ fibers 42 kg/cm$^2$ $\parallel$ fibers
Thermal conductivity $\lambda = 0.121$ kcal/hm° C.

EXAMPLE III

The operation is carried out as in Example I with the following constituents:

|  | % by weight |
|---|---|
| Ceramic fibers ("Fiberfrax" type) | 26 |
| Glass fibers, type E (6 mm) | 2.4 |
| Kaolin | 48 |
| Kaolinite clay (containing 53% kaolin) | 20 |
| 50% pVA emulsion in water | 1.8 |
| Modified cationic starch | 1.8 |

The modified starch (product of the Scholten Company) is introduced into the feed circuit of the machine in the state of an 8% solution in water prepared in the hot state.

The material obtained after drying constitutes a thermal shield which can be shaped by die-stamping. Said material satisfies the requirements laid down by the DIN standards in the case of asbestos boards (DIN 3752) and is also capable of withstanding temperatures of up to 1100° C. while retaining its coherent structure and its mechanical strength including high tensile strength.

This product has the following characteristics:

| Density | 1.05 |
|---|---|
| Tensile strength |  |
| after 7 days at 20° C. and 60% | 44 kg/cm$^2$ $\perp$ fibers |
| relative humidity | 54 kg/cm$^2$ $\parallel$ fibers |
| after 3 hours at 500° C. | 24 kg/cm$^2$ $\perp$ fibers |
|  | 33 kg/cm$^2$ $\parallel$ fibers |
| after 3 hours at 1000° C. | 29 kg/cm$^2$ $\perp$ fibers |
|  | 32 kg/cm$^2$ $\parallel$ fibers |
| Linear shrinkage at 1000° C. | 2.4% |
| at 1100° C. | 2.8% |
| Thermal conductivity | $\lambda = 0.124$ kcal/hm° C. |
| Solubility in 20% HCl | 3.3% weight loss |
| Ignition loss at 800° C. | 9.55% |
| Carbon content | 1.15% |

EXAMPLE IV

In the method of the previous examples, the following composition is employed:

|  | % by weight |
|---|---|
| Ceramic fibers, mean length 2 mm | 14 |
| Glass wool, means length 3 mm | 4 |
| Cellulose fibers | 2 |
| Kaolinite clay | 16 |
| Attapulgite (filler) | 18 |
| Wollastonite (mean diam. 6.6 microns) | 44.4 |
| Cold-soluble starch | 1 |
| Dextrin | 0.6 |
| Flocculant (amphoteric polyelectrolyte) | 0.009 |

The properties of the material obtained are as follows:

| Density | 0.94 |
|---|---|
| Tensile strength after 7 days at | 36 kg/cm$^2$ $\parallel$ fibers |
| 20° C. and 60% relative humidity | 26 kg/cm$^2$ $\perp$ fibers |
| Tensile strength after 3 hours at | 28 kg/cm$^2$ $\parallel$ fibers |
| 1000° C. | 24 kg/cm$^2$ $\perp$ fibers |
| Linear shrinkage |  |
| after 24 h at 800° C.: | 0.1% (expansion) |
| after 24 h at 1000° C.: | 0.9% (expansion) |
| after 24 h at 1100° C.: | 1.2% (expansion) |

| -continued | |
|---|---|
| Thermal conductivity | λ = 0.125 Kcal/hm° C. |
| Ignition loss after 24 h at 1100° C.: | 7.8% |
| Carbon content: | 1.05% |

EXAMPLE V

The composition employed is as follows:

| | % by weight |
|---|---|
| Ceramic fibers | 25 |
| Glass fibers | 1.4 |
| Kaolin of China clay type | 43 |
| Kaolinite clay | 8.2 |
| Ground sand | 20 |
| Modified cationic starch | 1.8 |
| Cold-soluble starch | 0.6 |

In a variant of this example, there are added to this composition 3 kg of cellulose per 100 kg of the mixture.

The materials obtained by carrying out the operation as in the previous examples have the following properties:

| Density | 0.9 |
|---|---|
| Tensile strength | |
| after 7 days at 20° C. and 60% | 36 kg/cm² ⊥ fibers |
| relative humidity | 47 kg/cm² // fibers |
| Thermal conductivity | λ = 0.118 kcal/hm° C. |
| Carbon content | 2.07% |

A remarkable property of the material lies in the fact that it is capable of bending with radii of curvature of 3 cm in the humidified state in respect of a plate thickness of 5 mm.

EXAMPLE VI

The composition employed comprises:

| | % by weight |
|---|---|
| Rock wool, mean length 0.85 mm | 40 |
| China clay kaolin | 32 |
| Kaolinite clay | 8.3 |
| Wollastonite | 17.2 |
| Soluble starch (non ionic) | 1 |
| Cationic starch | 1.5 |

The material in the form of plates is prepared as in the previous examples.

EXAMPLE VII

In the composition of Example IV given above, the assembly consisting of ceramic fibers and glass wool is replaced by rock wool having a mean length of 1.2 mm. In addition, the wollastonite employed has a mean particle diameter of 8.2 microns and a length/diameter ratio of 13 to 15. There is thus obtained a material having properties which are similar to those of the material of Example IV but at a substantially lower cost price.

EXAMPLE VIII

The material of the board type obtained in Example VII in the form of multi-layer plates 8 mm in thickness is introduced in a continuously operating oven in which it is heated for a period of 24 hours at 1150° C. There are thus obtained porous plates having a laminar structure which exhibits high resistance to acids.

It must naturally be understood that the invention is not limited to the proportions indicated in the examples or to the particular modes of operation described but extends in particular to all alternative forms and all combinations of the modes of execution hereinabove described.

We claim:

1. A composition based on mineral fibers free of asbestos, for use as a suspension in water to form a felt or board after filtering and drying, which consists essentially of at least 5 to 95% by weight of an inorganic fibrous material based on silica or silicates, which is a member selected from the group consisting of ceramic fibers, glass wool, rock wool and mixtures thereof, 10–70% by weight of Kaolin or Kaolinite clay, an organic binder, the proportion of organic substance being not greater than 8% of the total weight of dry substances of the composition, said organic binder containing at least 0.5% of soluble starch, and 10-60% of a mineral having a needle-like crystal structure which is wollastonite or mica.

2. The composition according to claim 1 which additionally contains cellulosic fibers in a proportion such that, depending on the proportion of said organic binder, the total quantity of cellulosic fibers and organic binder is less than 8% by weight.

3. A composition according to claim 1 which contains 45.05% of rock wool 28.96% of Kaolinite clay, 1.29% glass fibers, 2.06% cellulose fibers, 6.43% mica, 11.58% sand, and the organic binder consists of polyvinyl acetate and soluble starch in the total amount of less than 5% by weight.

4. The composition according to claim 1 which contains 14% of ceramic fibers, 4% glass wool, 2% cellulose fibers, 16% Kaolinite clay, 44.4% of wollastonite, and the organic binder consists of starch and dextrin in the total amount of less than 2%.

5. A composition according to claim 1, wherein said clay is in an amount of 10 to 50% by weight, said clay is kaolin or kaolinite clay and the composition additionally contains 5 to 45% of inert mineral fillers.

6. A composition according to claim 1, which contains 5 to 95% by weight of said inorganic fibrous material, 5 to 90% by weight of clay and 1 to 5% by weight of organic binder.

7. The composition according to claim 6 wherein said clay is in an amount of 10 to 70% by weight and the amount of said inorganic fibrous material is 10 to 50% by weight.

8. The composition according to claim 6 wherein said organic binder in addition to said soluble starch is a member selected from the group consisting of dextrins, polyvinyl acetate, natural gums, synthetic gums and mixtures thereof.

9. A composition according to claim 1, wherein said fibrous material is essentially constituted by a member selected from the group consisting of ceramic fibers, ceramic wools, rock wool, slag wool, scoria wool and mixtures thereof.

10. A composition according to claim 1, wherein said inorganic fibrous material contains glass wool or glass fibers in a proportion of 0.5 to 10% of the total weight of dry substances.

11. A method of fabrication of a board of felt based on mineral fibers free from asbestos, which consists of
(1) preparing a suspension in water of a composition free of asbestos based on mineral fibers which consists essentially of at least 5 to 95% by weight of an inorganic fibrous material based on silica or silicates, which is a member selected from the group consisting of ceramic fibers, glass wool, rock wool and mixtures thereof, 10–70% by weight of Kaolin or Kaolinite clay, an organic binder, the proportion of organic substances being not greater than 8% of the total weight of dry substances of the composition, said binder containing at least 0.5% of soluble starch and 10 to 60% by weight of a mineral based on silicates having a needle-like crystal structure which is wollastonite or mica, (2) removing water through a filtration support constituted by a moving band and depositing material on a rotary screen, (3) depositing and stacking successive layers of said material from said support on a rotating cylinder and (4) subjecting the product to drying until the moisture content is below 5% to cause hardening of the organic binder.

12. A method according to claim 11, wherein the dried product is baked at a temperature of 1050° C. to 1200° C. after shaping and machining.

13. A material of the laminar type prepared from the composition of claim 1 which exhibits tensile strength higher than 20 kg/cm$^2$ and up to 70 kg/cm$^2$, density of 0.5–1.3 and expansion less than 2% after 24 hours at 1000° C.

14. A baked laminar product prepared from the material of claim 2.

* * * * *